(12) United States Patent
Li et al.

(10) Patent No.: US 11,381,901 B2
(45) Date of Patent: Jul. 5, 2022

(54) WIRELESS HEADSET ROLE SWITCHING METHOD, WIRELESS HEADSET AND TWS HEADSET

(71) Applicant: GOERTEK TECHNOLOGY CO., LTD., Qingdao (CN)

(72) Inventors: Huijun Li, Qingdao (CN); Tao Zhang, Qingdao (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 17/058,748

(22) PCT Filed: Aug. 3, 2018

(86) PCT No.: PCT/CN2018/098536
§ 371 (c)(1),
(2) Date: Nov. 25, 2020

(87) PCT Pub. No.: WO2019/232912
PCT Pub. Date: Dec. 12, 2019

(65) Prior Publication Data
US 2021/0211798 A1    Jul. 8, 2021

(30) Foreign Application Priority Data
Jun. 6, 2018 (CN) .......................... 201810573848.1

(51) Int. Cl.
*H04R 1/10* (2006.01)
*H04M 1/72* (2021.01)
*H04W 84/20* (2009.01)

(52) U.S. Cl.
CPC ............ *H04R 1/1041* (2013.01); *H04M 1/72* (2013.01); *H04R 1/1025* (2013.01); *H04R 2420/03* (2013.01); *H04W 84/20* (2013.01)

(58) Field of Classification Search
CPC ..... H04M 1/72; H04R 1/1025; H04R 1/1041; H04R 2420/03; H04W 4/50; H04W 4/80;
(Continued)

(56) References Cited

U.S. PATENT DOCUMENTS 8,244,179 B2 * 8/2012 Dua .................. H04M 1/72412
455/41.2
8,433,243 B2 * 4/2013 Sharma .................. H04R 5/033
455/41.2
(Continued)

FOREIGN PATENT DOCUMENTS

CN    105786363 A    7/2016
CN    106937197 A    7/2017
(Continued)

OTHER PUBLICATIONS

International Search Report Translation from PCT/CN2018/098536 filed Aug. 3, 2018, dated Feb. 15, 2019.

*Primary Examiner* — Tan H Trinh
(74) *Attorney, Agent, or Firm* — Workman Nydegger

(57) ABSTRACT

Disclosed is a wireless headset role switching method, relating to the technical field of portable listening devices, wherein a main wireless headset is a headset currently establishing a connection with a terminal, and a slave wireless headset is a headset not currently establishing a connection with the terminal. The method includes: when receiving an in-place instruction, a main wireless headset sending connection information of the main wireless headset and a terminal to a slave wireless headset, so that the slave wireless headset initiates a connection request to the terminal according to the connection information and establishes a connection with the terminal, thereby completing wireless headset role switching. Also disclosed are a wireless headset, a wireless connection device role switching method, a
(Continued)

TWS headset and a computer-readable storage medium, having those beneficial effects.

15 Claims, 2 Drawing Sheets

(58) Field of Classification Search
CPC ... H04W 52/0296; H04W 84/20; Y02D 30/70
USPC ......... 455/41.1, 41.2, 41.3, 415, 445, 575.2, 455/569.1; 370/328, 338
See application file for complete search history.

(56) References Cited

U.S. PATENT DOCUMENTS

| | | | | |
|---|---|---|---|---|
| 8,606,334 B2* | 12/2013 | Goldman | ................ | H04W 8/22 455/569.1 |
| 10,085,216 B1* | 9/2018 | Younis | .............. | H04W 52/0251 |
| 2004/0203357 A1* | 10/2004 | Nassimi | ............ | H04M 1/72412 455/41.1 |
| 2006/0072525 A1* | 4/2006 | Hillyard | ................ | H04W 84/20 370/338 |
| 2006/0166674 A1* | 7/2006 | Bennett | ................ | H04W 88/06 455/445 |
| 2008/0101279 A1* | 5/2008 | Russell | .............. | H04M 1/6066 370/328 |
| 2009/0163141 A1* | 6/2009 | Chae | ................... | H04M 1/6066 455/41.3 |
| 2009/0279722 A1* | 11/2009 | Lin | ......................... | H04R 5/04 381/311 |
| 2010/0020998 A1* | 1/2010 | Brown | ................. | H04R 1/1041 381/380 |
| 2010/0039066 A1* | 2/2010 | Yuan | ....................... | H02J 7/025 320/108 |
| 2010/0320961 A1* | 12/2010 | Castillo | .................. | H04R 1/105 320/107 |
| 2011/0306393 A1* | 12/2011 | Goldman | ............ | H04M 1/6066 455/575.2 |
| 2012/0302170 A1* | 11/2012 | Frazier | .................. | H04W 84/20 455/41.3 |
| 2014/0370864 A1* | 12/2014 | Lin | ......................... | H04M 3/20 455/415 |
| 2017/0164089 A1* | 6/2017 | Lee | ...................... | H04R 1/1025 |
| 2017/0195802 A1* | 7/2017 | Eichfeld | .............. | H04R 25/305 |
| 2017/0230743 A1* | 8/2017 | Lee | ...................... | H04R 29/001 |
| 2019/0174232 A1* | 6/2019 | Tong | ....................... | H04W 4/80 |
| 2020/0396028 A1* | 12/2020 | Haartsen | ................ | H04W 84/20 |
| 2021/0219041 A1* | 7/2021 | Zhang | ..................... | H04R 1/08 |

FOREIGN PATENT DOCUMENTS

| | | |
|---|---|---|
| CN | 106998511 A | 8/2017 |
| CN | 107708014 A | 2/2018 |
| CN | 107809696 A | 3/2018 |
| CN | 107894881 A | 4/2018 |
| KR | 10-1518010 B1 | 5/2015 |
| WO | 2018/026201 A1 | 2/2018 |

* cited by examiner

WIRELESS HEADSET ROLE SWITCHING METHOD, WIRELESS HEADSET AND TWS HEADSET

This application is the national phase of International Application No. PCT/CN2018/098536, titled "WIRELESS HEADSET ROLE SWITCHING METHOD, WIRELESS HEADSET AND TWS HEADSET", filed on Aug. 3, 2018, which claims priority to Chinese Patent Application No. 201810573848.1, titled "WIRELESS HEADSET ROLE SWITCHING METHOD, WIRELESS HEADSET AND TWS HEADSET", filed on Jun. 6, 2018 with the China National Intellectual Property Administration (CNIPA), which is incorporated herein by reference in its entirety.

TECHNICAL FIELD

The present disclosure generally relates to the technical field of portable listening devices, and particularly, to a method for role switching of wireless headsets, a wireless headset, a method for role switching of wireless connection devices, a TWS headset, and a computer-readable storage medium.

BACKGROUND

A true wireless stereo (TWS) headset includes a master wireless headset and a slave wireless headset. The existing TWS headset applies a Bluetooth technology to transmit an audio signal of a mobile phone to the master wireless headset through a Bluetooth link, and the master wireless headset then transmits audio data to the slave wireless headset, thus to achieve simultaneous playback of the two headsets.

Currently, only one wireless headset (i.e., the master wireless headset) of the TWS headset is connected to the mobile phone. When the master wireless headset connected to the mobile phone is taken off and placed in a charging box, resulting in a disconnection of the master wireless headset from the mobile phone, or when the master wireless headset is disconnected from the mobile phone due to other trigger condition, the other slave wireless headset cannot continue to work, which makes a user unable to use the TWS headset normally and reduces user experience.

SUMMARY

An object of the present disclosure is to provide a method for role switching of wireless headsets, a wireless headset, a method for role switching of wireless connection devices, a TWS headset, and a computer-readable storage medium, which can make a slave wireless headset continue to work when a master wireless headset stops working, to ensure normal use of a user.

In order to solve the above technical problem, a method for role switching of wireless headsets is provided in the present disclosure. Where, a master wireless headset is a headset currently connected to a terminal, and a slave wireless headset is a headset currently not connected to the terminal, and the method includes:

sending, by the master wireless headset, connection information between the master wireless headset and the terminal to the slave wireless headset in response to receiving an in-position instruction, so that the slave wireless headset initiates a connection request to the terminal according to the connection information and establishes a connection to complete role switching of the wireless headsets, where, the in-position instruction is an instruction generated when it is detected that the master wireless headset is placed in a charging device.

In an embodiment, after sending, by the master wireless headset, the connection information to the slave wireless headset, the method further includes:

disconnecting the master wireless headset from the terminal.

In an embodiment, the method for role switching of the wireless headsets further includes:

sending, by the master wireless headset, current service information to the slave wireless headset, so that the slave wireless headset resumes a service according to the current service information.

In an embodiment, the sending, by the master wireless headset, connection information between the master wireless headset and the terminal to the slave wireless headset in response to receiving an in-position instruction includes:

sending, by the master wireless headset, the connection information between the master wireless headset and the terminal to the slave wireless headset through a wireless link, in response to receiving the in-position instruction.

In an embodiment, the method for role switching of the wireless headsets further includes:

obtaining, by the master wireless headset, a current electricity quantity of the master wireless headset, and receiving a current electricity quantity of the slave wireless headset sent by the slave wireless headset;

determining whether the wireless headsets are currently in a service state;

performing role switching of the wireless headsets according to the current electricity quantity of the master wireless headset, the current electricity quantity of the slave wireless headset, and a first electricity quantity balancing strategy, in response to a negative determination; and performing role switching of the wireless headsets according to the current electricity quantity of the master wireless headset, the current electricity quantity of the slave wireless headset, and a second electricity quantity balancing strategy, in response to a positive determination.

In an embodiment, the performing role switching of the wireless headsets according to the current electricity quantity of the master wireless headset, the current electricity quantity of the slave wireless headset, and the first electricity quantity balancing strategy includes:

not performing role switching of the wireless headsets, in a case that the current electricity quantity of the master wireless headset is not less than a first electricity quantity threshold;

performing role switching of the wireless headsets, in a case that the current electricity quantity of the master wireless headset is less than the first electricity quantity threshold, and the current electricity quantity of the slave wireless headset is greater than the current electricity quantity of the master wireless headset for more than a first preset value; and not performing role switching of the wireless headsets, in a case that the current electricity quantity of the master wireless headset is less than the first electricity quantity threshold, and the current electricity quantity of the slave wireless headset is not greater than the current electricity quantity of the master wireless headset for more than the first preset value.

In an embodiment, the performing role switching of the wireless headsets according to the current electricity quantity of the master wireless headset, the current electricity quantity of the slave wireless headset, and the second electricity quantity balancing strategy includes:

not performing role switching of the wireless headsets, in a case that the current electricity quantity of the master wireless headset is not less than a second electricity quantity threshold;

performing role switching of the wireless headsets, in a case that the current electricity quantity of the master wireless headset is less than the second electricity quantity threshold, and the current electricity quantity of the slave wireless headset is greater than the current electricity quantity of the master wireless headset for more than a second preset value; and not performing role switching of the wireless headsets, in a case that the current electricity quantity of the master wireless headset is less than the second electricity quantity threshold and the current electricity quantity of the slave wireless headset is not greater than the current electricity quantity of the master wireless headset for more than the second preset value.

A wireless headset is also provided in the present disclosure. The wireless headset includes: a communication interface, a memory, and a processor. Where the memory is configured to store a computer program, and the processor, when executing the computer program, perform steps of the method for role switching of the wireless headsets according to any one described above.

A method for role switching of wireless connection devices is also provided in the present disclosure, where a master wireless headset is a headset currently connected to a terminal, and a slave wireless headset is a headset currently not connected to the terminal, and the method includes:

sending, by the master wireless headset, connection information between the master wireless headset and the terminal to the slave wireless headset, in response to receiving an in-position instruction, where, the in-position instruction is an instruction generated when it is detected that the master wireless headset is placed in a charging device; and initiating, by the slave wireless headset, a connection request to the terminal according to the connection information, and establishing a connection, to complete role switching of the wireless headsets.

In an embodiment, the method for role switching of the wireless connection devices further includes:

sending, by the master wireless headset, current service information to the slave wireless headset; and resuming, by the slave wireless headset, a service according to the current service information.

In an embodiment, the method for role switching of the wireless connection devices further includes:

generating, by the charging device, the in-position instruction in response to detecting that the master wireless headset is placed in the charging device, and sending the in-position instruction to the master wireless headset.

In an embodiment, the generating, by the charging device, the in-position instruction in response to detecting that the master wireless headset is placed in the charging device further includes:

determining, by the charging device, whether the slave wireless headset is in the charging device, in response to detecting that the master wireless headset is placed in the charging device;

generating the in-position instruction, in response to a negative determination; and ending process, in response to a positive determination.

A TWS headset is also provided in the present disclosure. The TWS headset includes a master wireless headset and a slave wireless headset, where the master wireless headset is a headset currently connected to a terminal, and the slave wireless headset is a headset currently not connected to the terminal, the master wireless headset is configured to send connection information between the master wireless headset and the terminal to the slave wireless headset in response to receiving an in-position instruction, where, the in-position instruction is an instruction generated when it is detected that the master wireless headset is placed in a charging device; and the slave wireless headset is configured to initiate a connection request to the terminal according to the connection information and establish a connection, to complete role switching of the wireless headsets.

In an embodiment, the master wireless headset is further configured to send current service information to the slave wireless headset; and the slave wireless headset is further configured to resume a service according to the current service information.

In an embodiment, the TWS headset also includes:

a charging device, configured to generate the in-position instruction upon detecting that the master wireless headset is placed in the charging device, and send the in-position instruction to the master wireless headset.

In an embodiment, the charging device is further configured to determine whether the slave wireless headset is in the charging device in response to detecting that the master wireless headset is placed in the charging device, generate the in-position instruction if the slave wireless headset is in the charging device, and end process if the slave wireless headset is not in the charging device.

A charging device is also provided in the present disclosure. The charging device is configured to place a master wireless headset, the master wireless headset is a headset currently connected to a terminal, and a slave wireless headset is a headset currently not connected to the terminal, the charging device is configured to generate an in-position instruction in response to detecting that the master wireless headset is placed in the charging device, so that the master wireless headset sends connection information between the master wireless headset and the terminal to the slave wireless headset upon receiving the in-position instruction, and thus the slave wireless headset initiates a connection request to the terminal according to the connection information and establishes a connection, thereby completing role switching of the wireless headsets.

In an embodiment, the charging device is configured to generate an in-position instruction in response to detecting that the master wireless headset is placed in the charging device includes:

the charging device is configured to:

determine whether the slave wireless headset is in the charging device in response to detecting that the master wireless headset is placed in the charging device;

generate the in-position instruction, in response to a negative determination; and end process, in a response to a positive determination.

A computer-readable storage medium is also provided in the present disclosure, where the computer-readable storage medium stores a computer program, and the computer program, when executed by a processor, implements steps of the method for role switching of the wireless headsets according to any one described above; and/or, the computer program, when executed by a processor, implements steps of the method for role switching of the wireless connection devices according to any one described above.

The method for role switching of the wireless headsets according to the present disclosure relates to the technical field of portable listening devices. A master wireless headset is a headset currently connected to a terminal, and a slave wireless headset is a headset currently not connected to the terminal. The method includes: sending, by the master wireless headset, connection information between the master wireless headset and the terminal to the slave wireless headset in response to receiving an in-position instruction, so that the slave wireless headset initiates a connection request to the terminal according to the connection information and establishes a connection to complete role switching of the wireless headsets. where, the in-position instruction is an instruction generated when it is detected that the master wireless headset is placed in a charging device.

It can be seen that in this method, the master wireless headset sends the connection information between the master wireless headset and the terminal to the slave wireless headset when the master wireless headset is placed in the charging device, that is, when or before the master wireless headset is about to stop work, so that the slave wireless headset initiates the connection request to the terminal according to the connection information and establishes the connection, so as to ensure that the slave wireless headset can perform data interaction with the terminal to continue to work, and thus ensuring normal use of a user. That is, the method can avoid a situation in the conventional technology that the slave wireless headset cannot work even if it is in a wearing state after the master wireless headset stops working, thus improving user experience. The wireless headset, the method for role switching of the wireless connection devices, the TWS headset, and the computer-readable storage medium are also provided in the present disclosure, which have the above-mentioned beneficial effects that are not repeated here.

BRIEF DESCRIPTION OF THE DRAWINGS

In order to more clearly illustrate technical solutions in embodiments of the present invention or in the conventional technology, the drawings to be used in the description of the embodiments or the conventional technology will be briefly introduced below. Obviously, the drawings in the following description are merely some embodiments of the present disclosure. For those of ordinary skill in the art, other drawings may be obtained according to the provided drawings without any creative work.

DETAILED DESCRIPTION

The technical solution according to embodiments of the present disclosure will be described clearly and completely as follows in conjunction with the accompany drawings in the embodiments of the present disclosure, so as to make objectives, technical solutions and advantages of the present disclosure more clear. It is obvious that the described embodiments are only a part of embodiments of the present disclosure, rather than all of the embodiments. All other embodiments obtained by those skilled in the art based on the embodiments in the present disclosure without any creative work belong to the scope of protection of the present disclosure.

Figure 1:
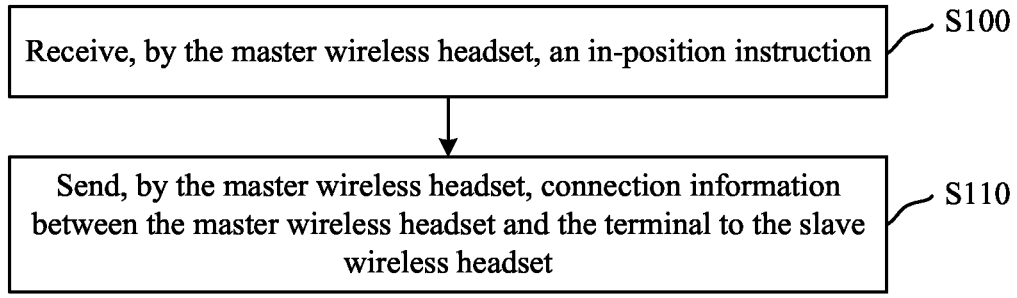
FIG. 1 is a flow chart of a method for role switching of wireless headsets according to an embodiment of the present disclosure.

A TWS headset technically refers to that a terminal wirelessly connects a master wireless headset, and then the master wireless headset wirelessly connects a slave wireless headset, so as to realize true wireless separation of left and right channels of Bluetooth. When the master wireless headset is not connected to the slave wireless headset, the master wireless headset connected to the terminal may play single track and may continue working. However, when the master wireless headset connected to the terminal is disconnected from the terminal, even if the slave wireless headset is currently still in a wearing state or a working state, since the slave wireless headset cannot establish a wireless connection with the terminal, which means data interaction cannot be achieved, the slave wireless headset cannot continue to work, thereby making a user unable to use the TWS headset normally and reducing user experience. In the embodiment, the slave wireless headset may establish a connection with the terminal according to connection information between the master wireless headset and the terminal, thus to continue to work, and the above problem has been solved. Reference is made to FIG. 1, which is a flow chart of a method for role switching of wireless headsets according to an embodiment of the present disclosure. The master wireless headset is a headset currently connected to the terminal, and the slave wireless headset is a headset currently not connected to the terminal. The method may include steps S100 to S110.

In step S100, an in-position instruction is received by the master wireless headset.

The in-position instruction is an instruction generated when it is detected that the master wireless headset is placed in a charging device. A specific form of the in-position instruction is not limited in this embodiment. For example, the in-position instruction may be a specific high level or low level, a small piece of data code, an identifier, or the like. A user may determine a required form according to an actual situation.

An execution subject of an operation of detecting that the master wireless headset is placed in the charging device is not limited in the embodiment. For example, the execution subject may be the master wireless headset, or may be the charging device. Further, a detection method is not limited in this embodiment. The user may make a corresponding setting according to a selected execution subject.

For example, if the execution subject is the master wireless headset, the detection method may be that when the master wireless headset detects that the master wireless headset is placed in the charging device, the master wireless headset generates the in-position instruction. Alternatively, the detection method may be that the master wireless headset generates initial in-position information when it detects that the master wireless headset is placed in the charging device, and determines whether an initial in-position information sent by the slave wireless headset is received; the master wireless headset generates the in-position instruction, if the initial in-position information sent by the slave wireless headset is not received and there is only the initial in-position information sent by the master wireless headset; the master wireless headset does not generate the in-position instruction, if the initial in-position information sent by the slave wireless headset and the initial in-position information sent by the master wireless headset are both received.

If the execution subject is the charging device, the detection method may be that when the charging device detects that the master wireless headset is placed in the charging device, the charging device generates the in-position instruction and sends the in-position instruction to the master wireless headset. Alternatively, the detection method may be that when the charging device detects that the master wireless headset and the slave wireless headset are both placed in the charging device, the charging device does not generate the in-position instruction. The charging device generates the in-position instruction when it only detects that the master wireless headset is placed in the charging device, and sends the in-position instruction to the master wireless headset.

In an embodiment, the wireless headset or the charging device may detect whether the master wireless headset or the slave wireless headset is placed in the charging device through a sensor. A type and a setting position of the sensor are not limited in the embodiment, and the user may set according to an actual situation. For example, if the sensor is a pressure sensor and the execution subject is the charging device, the pressure sensor may be disposed on a side of an arrange position of the master wireless headset in the charging device. Of course, the sensor may also be a light sensor.

In step S110, connection information between the master wireless headset and the terminal is sent by the master wireless headset to the slave wireless headset in response to the master wireless headset receiving the in-position instruction, so that the slave wireless headset initiates a connection request to the terminal according to the connection information and establishes a connection, thereby completing role switching of the wireless headsets.

Specifically, the master wireless headset receives the in-position instruction indicates that the master wireless headset has been placed in the charging device by the user, which means that the master wireless headset is about to stop working, that is, disconnected from the terminal. At this time, in order to ensure that the slave wireless headset can continue to work, the master wireless headset sends the connection information between the master wireless headset and the terminal to the slave wireless headset. For example, the master wireless headset sends the connection information between the master wireless headset and the terminal to the slave wireless headset through a wireless link. The slave wireless headset initiates the connection request to the terminal according to the connection information and establishes the connection, so as to achieve data interaction with the terminal, so that the slave wireless headset can continue to work, and normal use of the user is guaranteed. As such, the slave wireless headset achieves the connection with the terminal, and the role switching of the wireless headsets is completed.

Content of the connection information is not limited in this embodiment, as long as the slave wireless headset may establish a connection with the terminal based on the connection information, to realize the data interaction. For example, the connection information may include a media access control (MAC) address of the terminal.

Time at which the master wireless headset sends the connection information to the slave wireless headset is not limited in the embodiment, as long as the slave wireless headset may receive the current connection information with the terminal sent by the master wireless headset. For example, the master wireless headset may immediately send the connection information to the slave wireless headset once receiving the in-position instruction. Alternatively, the master wireless headset may send the connection information to the slave wireless headset when the master wireless headset is disconnected from the terminal. Alternatively, the master wireless headset may send the connection information to the slave wireless headset when the master wireless headset is disconnected from the slave wireless headset.

Since only one wireless headset can establish a connection with the terminal at any time, if the slave wireless headset wants to initiate the connection request to the terminal and establish the connection based on the connection information, the master wireless headset has to be disconnected from the terminal. Time at which the master wireless headset is disconnected from the terminal is not limited in this embodiment. For example, the master wireless headset may be disconnected from the terminal when the master wireless headset receives the in-position instruction. Alternatively, the master wireless headset may be disconnected from the terminal after the master wireless headset sends the connection information between the master wireless headset and the terminal to the slave wireless headset. Alternatively, the master wireless headset may also be disconnected from the terminal when the slave wireless headset is ready to establish the connection with the terminal. Of course, the shorter a time interval between disconnection of the master wireless headset from the terminal and establishment of the connection between the slave wireless headset and the terminal according to the connection information (that is, the shorter the time period when the two headsets are both not working), the better the user experience. Therefore, preferably, after the master wireless headset sends the connection information to the slave wireless headset, and before the slave wireless headset initiates the connection request to the terminal and establishes the connection according to the connection information, the method further includes: the master wireless headset is disconnected from the terminal.

Further, in order to ensure that the connection information can been successfully received by the slave wireless headset, a feedback mechanism may also be established in this embodiment, and it can be ensured through the feedback mechanism that the slave wireless headset successfully receives the connection information. A method for running the feedback mechanism is not specifically limited in the embodiment. For example, it may be that the slave wireless headset sends successful reception feedback information to the master wireless headset upon successfully receiving the connection information, and the master wireless headset determines that the connection information is successfully received by the slave wireless headset upon receiving the successful reception feedback information. Alternatively, if the slave wireless headset does not receive the connection information within a specified time period, the slave wireless headset sends a request for re-obtaining the connection information to the master wireless headset, until successfully receiving the connection information.

Based on the above technical solutions, in the method for role switching of the wireless headsets according to the embodiments of the present disclosure, it is to determine whether to perform role switching between the master wireless headset and the slave wireless headset by detecting an in-position state of the master wireless headset, that is, by detecting whether the master wireless headset is placed in the charging device, which solves the problem in the conventional technology that the slave wireless headset cannot continue to work due to placing the master wireless headset in the charging device and thus disconnecting the master wireless headset from the terminal.

Based on the above embodiments, this embodiment may further include:

current service information is sent by the master wireless headset to the slave wireless headset, so that the slave wireless headset resumes a service according to the current service information.

The current service information refers to current working data of the wireless headsets. For example, the slave wireless headset may determine, according to the current service information, whether the wireless headsets are currently playing music, or making a call, or playing a novel, and a progress of a current work, for example, which specific position of which song is being played now when the music is currently playing. As a result, after establishing the connection with the terminal, the slave wireless headset may continue to perform a previous task according to the current service information, so that the user does not feel the process of role switching between the two wireless headsets, and is not required to perform a playback action again, thereby improving the user experience.

Time at which the master wireless headset sends the current service information to the slave wireless headset is not limited in the embodiment, as long as the current service information is sent to the slave wireless headset before the master wireless headset is disconnected from the slave wireless headset. For example, the master wireless headset may send the current service information to the slave wireless headset after receiving the in-position instruction. Alternatively, the master wireless headset may send, to the slave wireless headset, the current service information along with the connection information between the master wireless headset and the terminal.

Further, in order to ensure that the current service information can been successfully received by the slave wireless headset, a feedback mechanism may also be established in this embodiment, and it can be ensured through the feedback mechanism that the slave wireless headset successfully receives the current service information. A method for running the feedback mechanism is not specifically limited in the embodiment. For example, it may be that the slave wireless headset sends successful reception feedback information to the master wireless headset upon successfully receiving the current service information, and the master wireless headset determines that the current service information is successfully received by the slave wireless headset upon receiving the successful reception feedback information. Alternatively, if the slave wireless headset does not receive the current service information within a specified time period, the slave wireless headset sends a request for re-obtaining the current service information to the master wireless headset, until successfully receiving the current service information.

Take a TWS headset as an example to illustrate the above process.

1. After the charging device is turned on, the master wireless headset and the slave wireless headset are paired and connected. After the pairing between the master wireless headset and the slave wireless headset is successful, the master wireless headset and a mobile phone are paired and connected.

2. The sensor detects that the master wireless headset is placed in the charging device. It may be that the master wireless headset sends an instruction to notify the master wireless headset its in-position state when a sensor of the master wireless headset detects that the master wireless headset is placed in the charging device, or it may be that the charging device sends an instruction to notify the master wireless headset its in-position state when the charging device detects that the master wireless headset is placed in the charging device.

3. The master wireless headset is disconnected from the mobile phone.

4. The master wireless headset sends the current service information and connection information with the mobile phone to the slave wireless headset.

5. The slave wireless headset initiates a connection request to the mobile phone. At this time, the slave wireless headset is switched to be a current master wireless headset, and the master wireless headset is switched to be a current slave wireless headset.

6. The current master wireless headset resumes a current working state (such as playing music) according to the current service information just received.

7. A playing state of the current slave wireless headset may be determined according to an actual situation. For example, the current master wireless headset works alone, if the current slave wireless headset is placed in the charging device and is in a turn-off state. The two wireless headsets may work together, if the current slave wireless headset is not in the turn-off state, and is taken out of the charging device.

Based on the above technical solutions, the method for role switching of the wireless headsets is provided in the embodiment of the present disclosure. Compared with the conventional technology that when the master wireless headset is placed in the charging device and the charging device is turned off, the master wireless headset is disconnected from the terminal, and the slave wireless headset cannot work separately, in this embodiment of the present disclosure, it is to detect the in-position state of the master wireless headset and switch roles of the two wireless headsets according to changes in the in-position state, thereby avoiding the problem that the slave wireless headset cannot work alone in the above situation, and optimizing the user experience.

Figure 2:
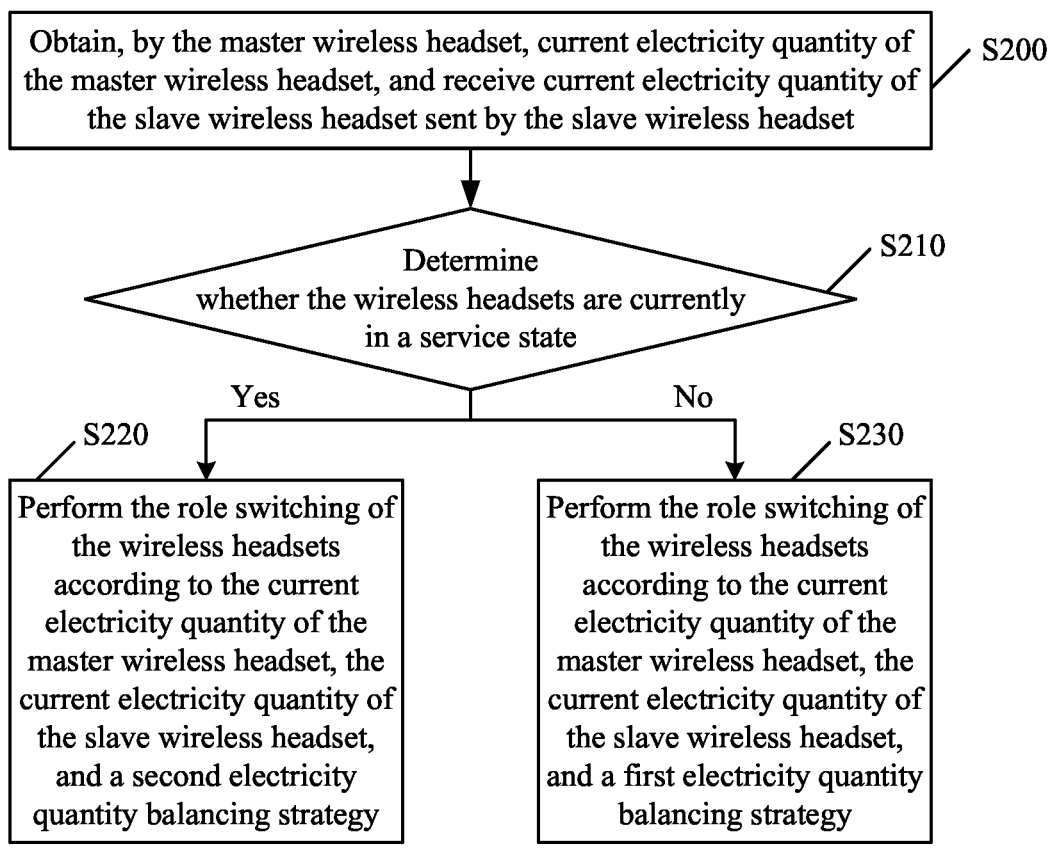
FIG. 2 is a flow chart of a method for role switching of wireless headsets according to another embodiment of the present disclosure.

During simultaneous wearing and use of the two wireless headsets of a TWS headset, the master wireless headset needs to maintain a wireless connection with the terminal and a wireless connection with the slave wireless headset at the same time. Meanwhile, the master wireless headset also plays a role of data transfer, that is, the master wireless headset forwards a request loaded by the slave wireless headset to the terminal and forwards data sent by the terminal to the slave wireless headset. While, the slave wireless headset only needs to maintain a wireless connection with the master wireless headset. Therefore, power consumption of the master wireless headset is higher than power consumption of the slave wireless headset during normal use, which causes an electricity quantity of the slave wireless headset to be higher than an electricity quantity of the master wireless headset. This embodiment aims at solving a problem that the electricity quantity of the master wireless headset is too low to be used while the slave wireless headset still has a lot of electricity quantity, thus to prolong use time of the TWS headset for a single charging. As illustrated in FIG. 2, based on any of the foregoing embodiments, this embodiment may further include steps S200 to S230.

In step S200, current electricity quantity of the master wireless headset is acquired by the master wireless headset, and current electricity quantity of the slave wireless headset sent by the slave wireless headset is received by the master wireless headset.

Specifically, when the two headsets are both in a working state or a wearing state, the master wireless headset respectively obtains the current electricity quantity of the master wireless headset and the current electricity quantity of the slave wireless headset, so that the role switching may be performed according to actual current electricity quantities of the two headsets, to finally achieve an object of balancing the electricity quantities of the two headsets, thus to prolong use time of the TWS headset for a single charging.

A frequency at which the master wireless headset obtains the current electricity quantities of the master wireless headset and the current electricity quantity of the slave wireless headset is not limited in the embodiment. For example, these electricity quantities may be obtained in real time, or may be obtained according to a certain period. Further, in order to reduce power consumption of the wireless headsets and make the electricity quantities of the wireless headsets not change much significantly within a short time interval, preferably, the master wireless headset may obtain the current electricity quantity of the master wireless headset and receive the current electricity quantity of the slave wireless headset sent by the slave wireless headset according to a predetermined period.

A specific value of the predetermined period is not limited in the embodiment, and the user may set the predetermined period according to actual changes in power consumption of the wireless headsets. Of course, the predetermined period is not limited in the embodiment. The user may determine a corresponding predetermined period according to actual current electricity quantities of the wireless headsets. For example, when the electricity quantities of the two wireless headsets are sufficient, it may be acquired the current electricity quantity of the master wireless headset and the current electricity quantity of the slave wireless headset at a long time interval, which means that a larger predetermined period may be set.

In step S210, it is to determine whether the wireless headsets are currently in a service state.

In this embodiment, it is further required to firstly determine a current service state when the role switching of the wireless headsets is performed according to an electricity quantity balancing strategy. Since changes of electricity quantities of the wireless headsets in the service state and a non-service state are different, a role switching of the wireless headsets is performed for each situation, which can reduce the number of switches while ensuring electricity quantity balance.

In step S230, the role switching of the wireless headsets is performed according to the current electricity quantity of the master wireless headset, the current electricity quantity of the slave wireless headset and a first electricity quantity balancing strategy, in response to a negative determination.

When the wireless headsets are currently in the non-service state (such as neither making a call nor listening to music), it indicates that the wireless headsets currently consume less power and therefore will not cause a larger difference of electricity quantity. The first electricity quantity balancing strategy is not specifically limited in this embodiment, as long as a corresponding electricity quantity balancing strategy may be determined according to the service state of the wireless headsets. Optionally, the first electricity quantity balancing strategy may be as follows:

the role switching of the wireless headsets is not performed, if the current electricity quantity of the master wireless headset is not less than a first electricity quantity threshold;

the role switching of the wireless headsets is performed, if the current electricity quantity of the master wireless headset is less than the first electricity quantity threshold, and the current electricity quantity of the slave wireless headset is greater than the current electricity quantity of the master wireless headset for more than a first preset value; and the role switching of the wireless headsets is not performed, if the current electricity quantity of the master wireless headset is less than the first electricity quantity threshold, and the current electricity quantity of the slave wireless headset is not greater than the current electricity quantity of the master wireless headset for more than the first preset value.

Specifically, specific values of the first electricity quantity threshold and the first preset value are not limited in the embodiment, and may be selected by a user according to an actual situation.

Further, although when the current electricity quantity of the master wireless headset is less than the first electricity quantity threshold and the current electricity quantity of the slave wireless headset is not greater than the current electricity quantity of the master wireless headset for more than the first preset value, which indicates that difference of electricity quantities between the master wireless headset and the slave wireless headset is not large and there is no need to perform role switching of the wireless headsets, when the electricity quantity of the master wireless headset is reduced to a certain value, for example, an electricity quantity at which the master wireless headset is about to shutdown, in order to prolong the use time of the TWS headset for a single charging, the role switching of the wireless headsets needs to be performed. Optionally, the role switching of the wireless headsets is performed if the current electricity quantity of the master wireless headset is less than the first electricity quantity threshold, and the current electricity quantity of the slave wireless headset is not greater than the current electricity quantity of the master wireless headset for more than the first preset value, but the current electricity quantity of the master wireless headset is less than a shutdown threshold.

In step S220, the role switching of the wireless headsets is performed according to the current electricity quantity of the master wireless headset, the current electricity quantity of the slave wireless headset, and a second electricity quantity balancing strategy, in response to a positive determination.

If the wireless headsets are currently in the service state (such as making a call or listening to a music), it indicates that they currently consume more power, which will cause a larger difference of electricity quantity. The second electric quantity balancing strategy is not specifically limited in the embodiment, as long as a corresponding electricity quantity balancing strategy may be determined according to the service state of the wireless headsets. Optionally, the second electricity quantity balancing strategy may be as follows:

the role switching of the wireless headsets is not performed, if the current electricity quantity of the master wireless headset is not less than a second electricity quantity threshold;

the role switching of the wireless headsets is performed, if the current electricity quantity of the master wireless headset is less than the second electricity quantity threshold, and the current electricity quantity of the slave wireless headset is greater than the current electricity quantity of the master wireless headset for more than a second preset value; and the role switching of the wireless headsets is not performed, if the current electricity quantity of the master wireless headset is less than the second electricity quantity threshold and the current electricity quantity of the slave wireless headset is not greater than the current electricity quantity of the master wireless headset for more than the second preset value.

Specifically, specific values of the second electricity quantity threshold value and the second preset value are not limited in the embodiment, and may be selected by the user according to an actual situation. Generally, the second electricity quantity threshold is smaller than the first electricity quantity threshold. The second preset value may be the same as the first preset value, and of course, they may be different, which is not limited in this embodiment.

Further, although when the current electricity quantity of the master wireless headset is less than the second electricity quantity threshold and the current electricity quantity of the slave wireless headset is not greater than the current electricity quantity of the master wireless headset for more than the second preset value, which indicates that difference of electricity quantities between the master wireless headset and the slave wireless headset is not large and there is no need to perform role switching of the wireless headsets, when the electricity quantity of the master wireless headset is reduced to a certain value, for example, an electricity quantity at which the master wireless headset is about to shutdown, in order to prolong the use time of the TWS headset for a single charging, the role switching of the wireless headsets needs to be performed. Optionally, the role switching of the wireless headsets is performed if the current electricity quantity of the master wireless headset is less than the second electricity quantity threshold, and the current electricity quantity of the slave wireless headset is not greater than the current electricity quantity of the master wireless headset for more than the second preset value, but the current electricity quantity of the master wireless headset is less than a shutdown threshold.

Take the TWS headset as an example to illustrate the above process.

1. When the TWS headset is started, a timer is started, and the current electricity quantity of the wireless headset is detected every certain interval;

2. if the two wireless headsets are paired and both in the wearing state, the slave wireless headset regularly reports its electricity quantity to the master wireless headset, and the master wireless headset regularly detects its own electricity quantity;

3. when the wireless headsets are in the non-service state:
   1) the role switching is not performed, if the electricity quantity of the master wireless headset is higher than or equal to 30%;
   2) the role switching between the master wireless headset and the slave wireless headset is performed, if the electricity quantity of the master wireless headset is lower than 30%, and the electricity quantity of the slave wireless headset is higher than the electricity quantity of the master wireless headset by 20% or the above; and
   3) the role switching is not performed, if the electricity quantity of the master wireless headset is less than 30%, and the electricity quantity of the slave wireless headset is not higher than that of the master wireless headset by 20% or the above, and until the electricity quantity of the master wireless headset is low enough to shutdown, the role switching is performed;

4. when the wireless headsets are in the service state:
   1) the role switching is not performed, if the electricity quantity of the master wireless headset is higher than or equal to 10%;
   2) the role switching between the master wireless headset and the slave wireless headset is performed, if the electricity quantity of the master wireless headset is lower than 10%, and the electricity quantity of the slave wireless headset is higher than the electricity quantity of the master wireless headset by 20%;
   3) the role switching is not performed, if the electricity quantity of the master wireless headset is less than 10%, and the electricity quantity of the slave wireless headset is not higher than the electricity quantity of the master wireless headset by 20%, and until the electricity quantity of the master wireless headset is low enough to shutdown, the role switching is performed.

Based on the above technical solution, in the method for role switching of the wireless headsets according to the embodiment of the present disclosure, since the power consumption of the master wireless headset is higher than that of the slave wireless headset, the electricity quantity of the master wireless headset is lower than that of the slave wireless headset under a same condition. The role switching may be performed between the two wireless headsets if a predetermined condition is met, which prolongs the use time of the headsets for a single charging. In order to further improve an accuracy of switching, in this embodiment, different electricity quantity balancing strategies are proposed according to the service state and the non-service state, which reduces the number of switches while prolonging the use time of the wireless headset, thereby ensuring a better user experience.

A wireless headset, a method for role switching of wireless connection devices, a TWS headset, and a computer-readable storage medium according to embodiments of the present disclosure are described hereinafter. The wireless headset, the method for role switching of the wireless connection devices, the TWS headset, and the computer-readable storage medium described hereinafter may be referred to the method for role switching of the wireless headsets described above.

The wireless headset is also provided in an embodiment of the present disclosure. The wireless headset includes: a communication interface, a memory, and a processor. The memory is configured to store a computer program, and the processor, when executing the computer program, implements steps of the method for role switching of the wireless headsets according to any of the foregoing embodiments. For example, the processor, when executing the computer program, implements step of sending connection information between the master wireless headset and the terminal to the slave wireless headset if the master wireless headset receives an in-position instruction, so that the slave wireless headset initiates a connection request to the terminal according to the connection information and establishes a connection to complete role switching of the wireless headsets. The in-position instruction is an instruction generated when it is detected that the master wireless headset is placed in a charging device.

Figure 3:
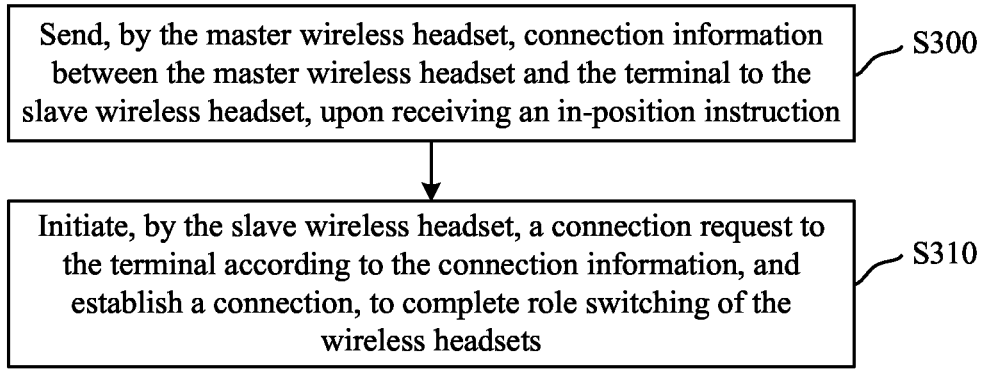
FIG. 3 is a flow chart of a method for role switching of wireless connection devices according to an embodiment of the present disclosure.

Reference is made to FIG. 3, which is a flow chart of a method for role switching of wireless connection devices according to an embodiment of the present disclosure. A master wireless headset is a headset currently connected to a terminal, and a slave wireless headset is a headset currently not connected to the terminal, and the method includes the following steps S300 and S310.

In step S300, connection information between the master wireless headset and the terminal is sent by the master wireless headset to the slave wireless headset, in response to the master wireless headset receiving an in-position instruction. The in-position instruction is an instruction generated when it is detected that the master wireless headset is placed in a charging device; and In step S310, a connection request to the terminal is initiated by the slave wireless headset according to the connection information, and a connection is established, to complete role switching of the wireless headset.

Based on the above embodiment, the method may further include:

current service information is sent by the master wireless headset to the slave wireless headset; and a service is resumed by the slave wireless headset according to the current service information.

Based on any of the above embodiments, the method may further include:

the in-position instruction is generated by the charging device when the charging device detects that the master wireless headset is placed in the charging device, and the in-position instruction is sent to the master wireless headset.

The charging device in this embodiment may specifically be a charging box.

Based on the foregoing embodiments, in order to improve efficiency of role switching in this embodiment, the generating, by the charging device, the in-position instruction in response to detecting that the master wireless headset is placed in the charging device:

determining, by the charging device, whether the slave wireless headset is in the charging device, in response to detecting that the master wireless headset is placed in the charging device;

generating the in-position instruction, in response to a negative determination; and ending process, in response to a positive determination.

Specifically, if the slave wireless headset is not placed in the charging device, it indicates that the slave wireless headset is in an able-to-work state at this time, that is, the master wireless headset may send the connection information to the slave wireless headset, so that the slave wireless headset may use the connection information to establish the connection to the terminal, thereby solving the problem in the conventional technology that the slave wireless headset cannot continue to work due to the master wireless headset being placed in the charging device and disconnected from the terminal. In this method, if the slave wireless headset is placed in the charging device, end the process, that is, the connection information between the master wireless headset and the terminal is no longer sent to the slave wireless headset. At this time the user has placed both wireless headsets in the charging device, and it indicates that the user wants to stop using the wireless headsets. Therefore, in order to save process, there is no need to send the connection information between the master wireless headset and the terminal to the slave wireless headset.

Figure 4:
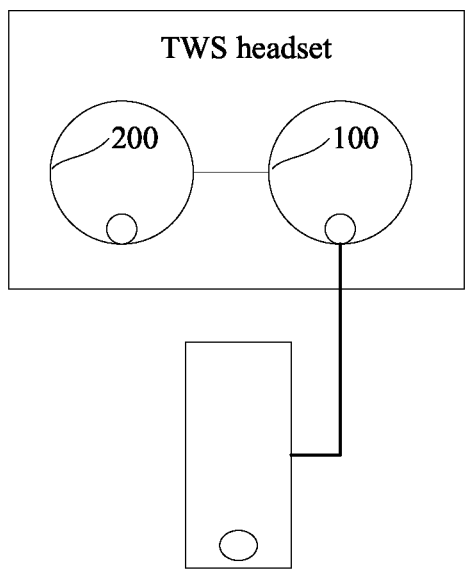
FIG. 4 is a structural block diagram of a TWS headset according to an embodiment of the present disclosure.

Reference is made to FIG. 4, which is a structural block diagram of a TWS headset according to an embodiment of the present disclosure. TWS (True Wireless Stereo) means true wireless stereo, and the TWS headset refers to a headset applying the TWS technology. The TWS headset includes a master wireless headset 100 and a slave wireless headset 200. The master wireless headset 100 is a headset currently connected to a terminal, and the slave wireless headset 200 is a headset currently not connected to the terminal.

The master wireless headset 100 is configured to send connection information between the master wireless headset 100 and the terminal to the slave wireless headset 200 in response to receiving an in-position instruction. The in-position instruction is an instruction generated when it is detected that the master wireless headset 100 is placed in a charging device; and The slave wireless headset 200 is configured to initiate a connection request to the terminal according to the connection information and establish a connection, to complete role switching of the wireless headsets.

Based on the above embodiment, the master wireless headset 100 may be further configured to send current service information to the slave wireless headset 200; and the slave wireless headset 200 may be further configured to resume a service according to the current service information.

Based on any of the above embodiments, the TWS headset may further include the charging device.

The charging device is configured to generate the in-position instruction upon detecting that the master wireless headset is placed in the charging device, and send the in-position instruction to the master wireless headset.

The charging device in this embodiment may specifically be a charging box.

Based on the above embodiment, the charging device is specifically configured to determine whether the slave wireless headset is in the charging device in response to detecting that the master wireless headset is placed in the charging device, generate the in-position instruction if the slave wireless headset is in the charging device, and end process if the slave wireless headset is not in the charging device.

A computer-readable storage medium is also provided in the present disclosure, where the computer-readable storage medium stores a computer program, and the computer program, when executed by a processor, implements steps of the method for role switching of the wireless headsets according to any one of the embodiments above; and/or, the computer program, when executed by a processor, implements steps of the method for role switching of the wireless connection devices according to any one of the embodiments above.

The computer-readable storage medium may include: a USB flash drive, a portable hard disk, read-only memory (Read-Only Memory, ROM), random access memory (Random Access Memory, RAM), magnetic disk, optical disk, and any other medium that can store program codes.

The connections mentioned in the above embodiments are all wireless connections, such as Bluetooth (BT) connection or Bluetooth low energy (BLE) connection. The connection process is not limited in embodiments of this disclosure, and reference to the conventional technology may be made for details.

The embodiments in the specification are described in a progressive manner. Each embodiment focuses on the differences from other embodiments, and the same or similar parts between various embodiments may be referred to each other. For the apparatus disclosed in the embodiment, since it corresponds to the method disclosed in the embodiment, the description thereof is relatively simple, and the relevant part may be referred to the description of the method part.

Professionals shall further realize that the units and algorithm steps of each example described in combination with the embodiments disclosed herein may be implemented by electronic hardware, computer software, or a combination of both. In order to clearly illustrate the interchangeability of hardware and software, the composition and steps of each example have been generally described in accordance with the function in the above description. Whether these functions are executed by hardware or software depends on the specific application and design constraints of the technical solution. Professionals and technicians may use different methods for each specific application to implement the described functions, but such implementation shall not be considered as beyond the scope of the present disclosure.

The steps of the method or algorithm described in combination with the embodiments disclosed herein may be directly implemented by hardware, a software module executed by a processor, or a combination of the two. The software module may be placed in random access memory (RAM), internal memory, read-only memory (ROM), electrically programmable ROM, electrically erasable programmable ROM, register, hard disk, removable disks, CD-ROM, or any other form of storage medium common known in the technical field.

A method for role switching of wireless headsets, a wireless headset, a method for role switching of wireless connection devices, a TWS headset and a computer-readable storage medium according to the present disclosure are described above in detail. Specific examples are used herein to illustrate the principle and implementation of the present disclosure. The illustration of the above embodiments is only used to help understand the method and the core ideas of the present disclosure. It should be noted that for those of ordinary skill in the art, several improvements and modifications may be made to the present disclosure without departing from the principle of the present disclosure, and these improvements and modifications shall fall within the protection scope of the claims of the present disclosure.

The invention claimed is:

1. A method for role switching of wireless headsets, wherein, a master wireless headset is a headset currently connected to a terminal, and a slave wireless headset is a headset currently not connected to the terminal, wherein the method comprises:
   in response to determining that the master wireless headset is placed in a charging device, sending, by the master wireless headset, connection information between the master wireless headset and the terminal to the slave wireless headset so that the slave wireless headset initiates a connection request to the terminal according to the connection information and establishes a connection with the terminal to complete role switching of the wireless headsets.

2. The method for role switching of the wireless headsets according to claim 1, wherein after sending, by the master wireless headset, the connection information to the slave wireless headset, the method further comprises:
   disconnecting the master wireless headset from the terminal.

3. The method for role switching of the wireless headsets according to claim 1, further comprising:
   sending, by the master wireless headset, current service information to the slave wireless headset, so that the slave wireless headset resumes a service according to the current service information.

4. The method for role switching of the wireless headsets according to claim 1, further comprising:
   obtaining, by the master wireless headset, a current electricity quantity of the master wireless headset, and receiving a current electricity quantity of the slave wireless headset sent by the slave wireless headset;
   determining whether the wireless headsets are currently in a service state;
   performing role switching of the wireless headsets according to the current electricity quantity of the master wireless headset, the current electricity quantity of the slave wireless headset, and a first electricity quantity balancing strategy, in response to a negative determination; and
   performing role switching of the wireless headsets according to the current electricity quantity of the master wireless headset, the current electricity quantity of the slave wireless headset, and a second electricity quantity balancing strategy, in response to a positive determination.

5. The method for role switching of the wireless headsets according to claim 4, wherein the performing role switching of the wireless headsets according to the current electricity quantity of the master wireless headset, the current electricity quantity of the slave wireless headset, and the first electricity quantity balancing strategy comprises:
   not performing role switching of the wireless headsets, in a case that the current electricity quantity of the master wireless headset is not less than a first electricity quantity threshold;
   performing role switching of the wireless headsets, in a case that the current electricity quantity of the master wireless headset is less than the first electricity quantity threshold, and the current electricity quantity of the slave wireless headset is greater than the current electricity quantity of the master wireless headset by more than a first preset value; and
   not performing role switching of the wireless headsets, in a case that the current electricity quantity of the master wireless headset is less than the first electricity quantity threshold, and the current electricity quantity of the slave wireless headset is not greater than the current electricity quantity of the master wireless headset by more than the first preset value.

6. The method for role switching of the wireless headsets according to claim 4, wherein the performing role switching of the wireless headsets according to the current electricity quantity of the master wireless headset, the current electricity quantity of the slave wireless headset, and the second electricity quantity balancing strategy comprises:
   not performing role switching of the wireless headsets, in a case that the current electricity quantity of the master wireless headset is not less than a second electricity quantity threshold;
   performing role switching of the wireless headsets, in a case that the current electricity quantity of the master wireless headset is less than the second electricity quantity threshold, and the current electricity quantity of the slave wireless headset is greater than the current electricity quantity of the master wireless headset by more than a second preset value; and
   not performing role switching of the wireless headsets, in a case that the current electricity quantity of the master wireless headset is less than the second electricity quantity threshold and the current electricity quantity of the slave wireless headset is not greater than the current electricity quantity of the master wireless headset by more than the second preset value.

7. A wireless headset, comprising: a communication interface, a memory, and a processor, wherein the memory is configured to store a computer program, and the processor is configured to, when executing the computer program, perform steps of the method for role switching of the wireless headsets according to claim 1.

8. A method for role switching of wireless connection devices, wherein a master wireless headset is a headset currently connected to a terminal, and a slave wireless headset is a headset currently not connected to the terminal, wherein the method comprises:

in response to determining that the master wireless headset is placed in a charging device, sending, by the master wireless headset, connection information between the master wireless headset and the terminal to the slave wireless headset; and initiating, by the slave wireless headset, a connection request to the terminal according to the connection information, and establishing a connection with the terminal, to complete role switching of the wireless headsets.

9. The method for role switching of the wireless connection devices according to claim 8, further comprising:

sending, by the master wireless headset, current service information to the slave wireless headset; and resuming, by the slave wireless headset, a service according to the current service information.

10. The method for role switching of the wireless connection devices according to claim 8, wherein the determining that the master wireless headset is placed in a charging device comprises:

determining that the master wireless headset is placed in the charging device in response to detecting that the master wireless headset is placed in the charging device.

11. The method for role switching of the wireless connection devices according to claim 10, wherein the determining that the master wireless headset is placed in the charging device in response to detecting that the master wireless headset is placed in the charging device further comprises:

determining, by the charging device, whether the slave wireless headset is in the charging device, in response to detecting that the master wireless headset is placed in the charging device; and determining, by the charging device, that the master wireless headset is placed in the charging device in a case that the slave wireless headset is not in the charging device.

12. A true wireless stereo (TWS) headset comprising a master wireless headset and a slave wireless headset, wherein the master wireless headset is a headset currently connected to a terminal, and the slave wireless headset is a headset currently not connected to the terminal, wherein, the master wireless headset is configured to send connection information between the master wireless headset and the terminal to the slave wireless headset in response to determining that the master wireless headset is placed in a charging device; and the slave wireless headset is configured to initiate a connection request to the terminal according to the connection information and establish a connection with the terminal, to complete role switching of the wireless headsets.

13. The TWS headset according to claim 12, wherein the master wireless headset is further configured to send current service information to the slave wireless headset; and the slave wireless headset is further configured to resume a service according to the current service information.

14. The TWS headset according to claim 12, further comprising the charging device, wherein the charging device is configured to determine that the master wireless headset is placed in the charging device in response to detecting, by the charging device, that the master wireless headset is placed in the charging device.

15. The TWS headset according to claim 14, wherein, the charging device is further configured to determine whether the slave wireless headset is in the charging device in response to detecting that the master wireless headset is placed in the charging device, and to determine that the wireless headset is placed in the charging device in a case that if the slave wireless headset is not in the charging device.

* * * * *